United States Patent [19]
Smith

[11] 3,815,206
[45] June 11, 1974

[54] WIRE PROTECTING COIL PLACING METHOD AND APPARATUS

[75] Inventor: Dallas F. Smith, Fort Wayne, Ind.

[73] Assignee: General Electric Corporation, Ft. Wayne, Ind.

[22] Filed: Dec. 4, 1972

[21] Appl. No.: 311,769

[52] U.S. Cl. ............................... 29/205 D, 29/606
[51] Int. Cl. ........................ H02k 15/06, H01f 7/06
[58] Field of Search....... 29/606, 205 D, 205 R, 401

[56] References Cited
UNITED STATES PATENTS

| | | |
|---|---|---|
| 3,324,536 | 6/1967 | Hill .................................. 29/606 X |
| 3,353,255 | 11/1967 | Short .................................. 29/401 |
| 3,389,865 | 6/1968 | Stuckey ............................. 242/1.1 |
| 3,685,118 | 8/1972 | Payne et al. ..................... 29/205 D |
| 3,689,976 | 9/1972 | Donovan............................ 29/205 D |

*Primary Examiner*—Thomas H. Eager

[57] ABSTRACT

Method and apparatus for inserting prewound coils into stator core slots is disclosed including a plurality of simultaneously movable elongated thin-walled members adapted to overlie or cover the saw tooth surfaces presented by the sides of stator teeth and to be slideable on a wedge guide configured to approximately correspond to, or be slightly larger in profile than, a stator tooth. Thin-walled members extend through and at least slightly beyond the stator for the subsequent movement of prewound coils along the members and into selected stator slots while being protected from rough surfaces by the members. Prewound coils may be placed between selected ones of the elongated members, a stator positioned at the free extremity of the elongated members, the elongated members moved through the stator, and the coils moved along the elongated members and into stator slots.

14 Claims, 4 Drawing Figures

WIRE PROTECTING COIL PLACING METHOD AND APPARATUS

CROSS REFERENCE TO RELATED APPLICATIONS

Habegger application Ser. No. 311,770, titled MEANS AND METHOD OF ALIGNING COIL INJECTION TOOLING WITH A STATOR CORE, and filed on the same day as this application is a related application. Schlaudroff and McKinley application Ser. No. 311,815, titled WINDING INSERTING APPARATUS, and filed on the same day as this application also is a related application.

BACKGROUND OF THE INVENTION

The present invention relates generally to improved apparatus and methods for developing windings in electromagnetic devices and more particularly to apparatus and method for placing prewound coils into stator cores. More specifically, the present invention relates to covering sharp or rough corners or sides of stator teeth with thin-walled members and moving prewound coils along such members and into the slots between the teeth so covered.

Various forms of apparatus and methods for developing windings in the slots of dynamoelectric machine stators are known in the art. One general approach known heretofore involves the development and placement of winding coils (each formed of one or more winding turns) in tools that then are used while placing the winding coils into stator slots. This approach may involve the use of equipment illustrated, for example, in Mason U.S. Pat. No. 2,934,099; Duff et al U.S. Pat. No. 3,528,170; Hill U.S. Pat. No. 3,324,536; Smith U.S. Pat. No. 3,514,837; Cutler et al U.S. Pat. No. 3,522,650; or Arnold U.S. Pat. No. 3,672,039; (the entire disclosures of all of which are specifically incorporated herein by reference). With the equipment illustrated in any of the just mentioned patents, winding turns are generated and coil groups developed, and only then are the winding turns placed or "injected" into the slots of a laminated magnetizable core.

The prior coil injection systems generally employ a plurality of rigid blades or fingers that mate with corresponding stator teeth, and on occasion in prior systems, alternate ones of the blades are affixed to a stripper while other ones of the blades are secured or fixed to a blade support that is movable relative to the stripper.

In coil injection systems of the type above referred to, at least a portion of each winding turn is passed between adjacent stator teeth and into a core slot. These stator teeth typically will have sharp edges, burrs, and generally rough or saw tooth side walls or edges that may on occasion cause damage to the winding material during the injection procedure. Most present day stators comprise a stack of relatively thin punch press produced laminations which present rough edges not only to the stator bore but also along the interior portions of the stator slot and particularly along those portions of a stator tooth just inside the stator slot. Prior art coil injection systems may prevent direct contact between the windings and the portions of the stator teeth facing into the stator bore as well as the sharp corners thereof but do not prevent such contact along those portions of the stator tooth interior to the slots. Moreover, when the fingers or blades are of the individual "pin" type as shown, for example, in FIG. 9 of Hill U.S. Pat. No. 3,324,536; the lips that are provided to slightly project into the slots of the stator core must be relatively thick (e.g., on the order of about 0.010 to 0.015 of an inch thick each, with a dimension therebetween that is about 0.005 of an inch greater than the core tooth width at the bore). Slot openings for many fractional horsepower motors on the other hand, typically range from about 0.085 to 0.095 of an inch. Therefore, it will be understood that from about 0.022 to 0.033 of an inch of a typical slot opening for a core will be obstructed or blocked because of the relatively rigid lips on tooling of the type presently known.

Accordingly it is a general object of the present invention to provide an improved coil injection system.

Another object of the present invention is to provide methods and apparatus for minimizing winding damage during a coil injection operation.

It is a further object of the present invention to facilitate the injection of prewound coils into a dynamoelectric machine stator.

Still another object of the present invention is to prevent damaging contact between prewound coils and stator teeth during the insertion of those coils into stator slots by utilizing relatively flexible thin-walled members.

SUMMARY OF THE INVENTION

In a preferred exemplification, a coil injection machine for the injection of prewound coils into selected slots of a magnetic stator core is provided with a plurality of movable elongated thin-walled members having a substantially uniform cross-sectional configuration for at least a distance equal to the stack height of a stator core which is to receive those coils. The members are disposed in parallel upstanding relation in a pattern that approximately coincides with a stator bore, and are movable in unison in a direction substantially along the stator bore axis so as to be passed through the bore of the stator. In this manner, I provide a smooth surface along which preplaced coils may be moved for insertion into selected stator slots, and yet provide a minimum amount of obstruction in the stator slot opening, since the extending part of the members are closely (although freely or loosely) positioned along the stator core teeth.

The subject matter which I regard as my invention is particularly pointed out and distinctly claimed in the concluding portion of the specification. The invention itself, however, together with further objects and advantages thereof, may be best understood by reference to the following description taken in conjunction with the accompanying drawings wherein:

DESCRIPTION OF THE PREFERRED EMBODIMENT

Figure 1:
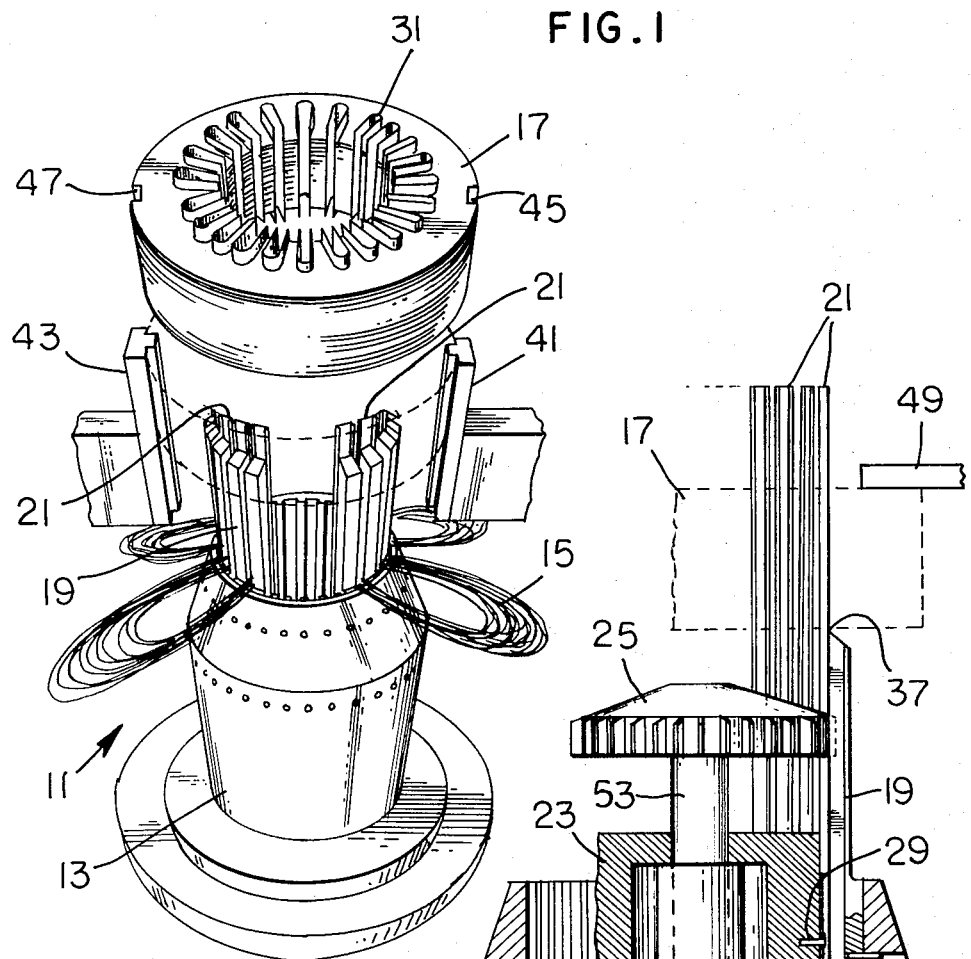
FIG. 1 is a perspective view of apparatus embodying the present invention in one form thereof.
Figure 3:
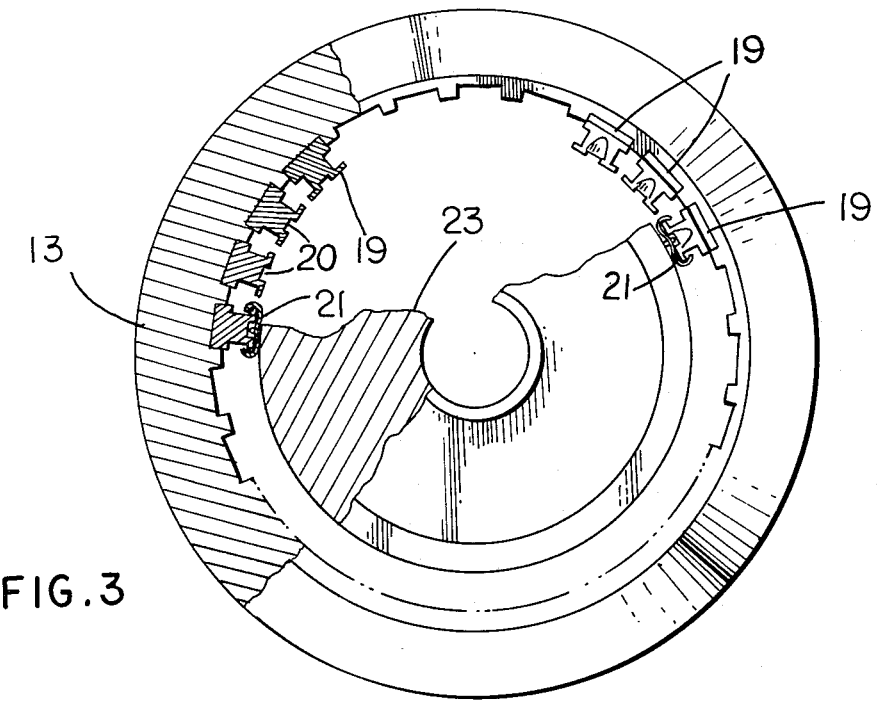
FIG. 3 is a top view of a portion of the apparatus of FIG. 1, with parts removed.

In FIG. 1 I have shown a coil injection machine 11 having a head 13 which supports tooling for placing prewound coils 15 into the slots of a magnetic stator core 17. The tooling may include a plurality of wedge guides 19, a plurality of movable, relatively flexible, elongated, thin-walled members 21 supported in parallel upstanding relation by a retaining ring 23 that is driveable for moving these members 21 simultaneously through the bore of a stator 17. A stripper 25 is provided for simultaneously moving the coils 15 along the members 21 and into selected slots in the stator 17. The wedge guides 19 are fixedly supported by the head 13 in parallel upstanding relationship substanially about the periphery of a circle as is better seen in FIG. 3. The cross-sectional configuration of that portion of the wedge guides nearest the center of the coil injection machine is generally the same (although preferably slightly larger) as the cross-sectional configuration of a corresponding stator tooth. The thin-walled members 21 are adapted to fit around this tooth shaped portion of the wedge guide with a sliding fit and thus also be movable with a sliding fit along a stator tooth.

Figure 4:
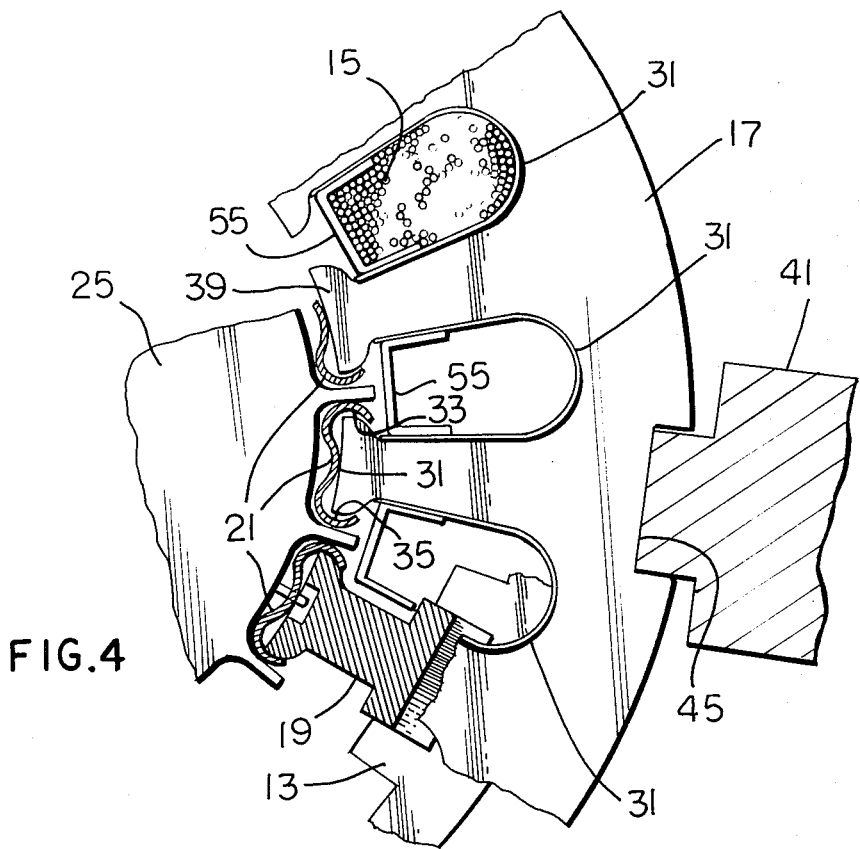
FIG. 4 is an enlarged top view of a fragment of the apparatus of FIG. 1, again with some parts removed.

As better seen in FIG. 4 the elongated members 21 have a substantially uniform shaped cross-sectional configuration which may be best described as resembling the numeral "3." Each member 21 is of a length to permit it to extend at least for a distance equal to the stack height of a stator core which is to receive the coils 15. Preferably, the cross-sectional configuration of the members 21 is substantially the same throughout the length or extent of the thin-walled members. The thin-walled members or blades 21 are attached to a support 23 for example, by providing a pair of holes in each member 21 and a corresponding pair of pins 27 and 29 that are received in such holes. The pins 27 and 29 may be headed, but do not necessarily need to be. In addition, the pins may be threaded into support 23 or, if desired, spring loaded so that they will pass through the holes in members 21 and bear against the bottom of grooves 20 in the guides 19.

The members or blades 21 may, for example, be of a spring steel material in the neighborhood of .008 or .010 of an inch in thickness and as revealed in FIG. 4 are preferably configured to be in close proximity to a stator tooth at substantially three regions denoted by reference numerals 31, 33, and 35. The free extremities of the members 21 may be, when desired, flared slightly to facilitate movement of members 21 axially along a stator core. By flaring the ends of members 21 in this manner, the members 21 may be more readily lead along the stator teeth.

Figure 2:
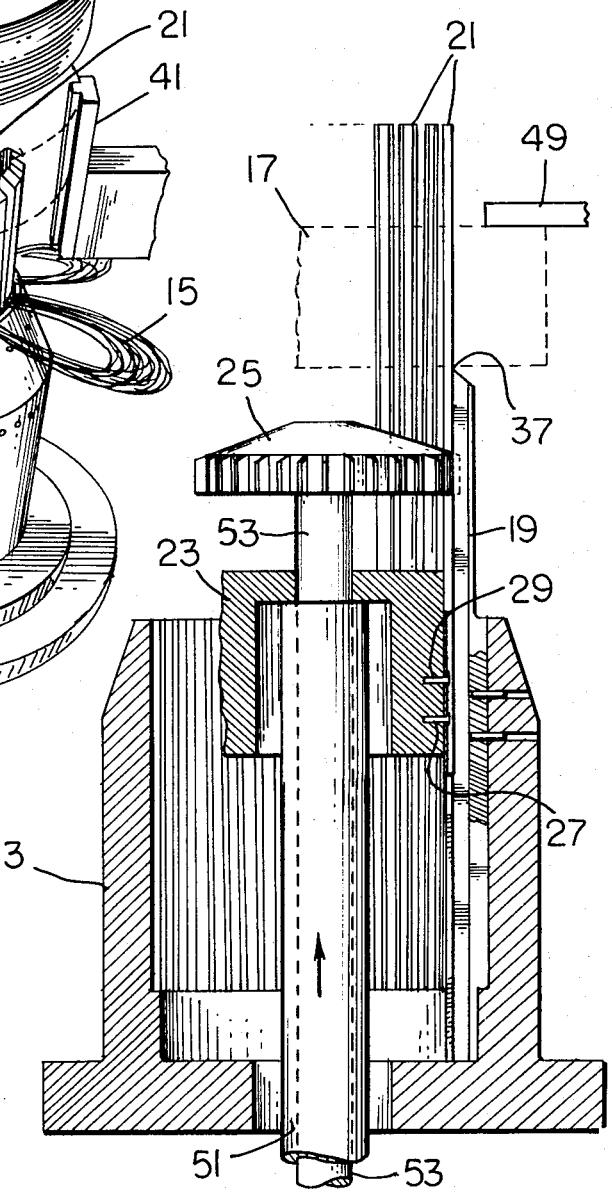
FIG. 2 is a side elevation, with parts in section and parts broken away, of the apparatus of FIG. 1, and illustrates the internal parts of such apparatus.

With reference now to FIGS. 1 and 2, prewound coils 15 are selectively looped over the parallel upstanding members 21 and pushed down along those members, along the gaps defined by adjacent wedge guides, so as to be below the uppermost extent 37 of the wedge guides 19. A stator 17 which may be provided with insulative slot liners 31 or other suitable insulating material is then placed onto the free extremities of members 21 so as to seat against the wedge guides at 37. Each member 21 then will fit around a stator tooth 39 in the manner depicted in FIG. 4. The preferred three region contact between members 21 and core teeth is of particular advantage at this time since the members 21 are relatively flexible and less difficulty may be experienced due to any twisting of the members 21 when they are engaged by corresponding stator teeth. To minimize initial alignment difficulties member 23 is preferably in its retracted or "down" position as viewed in FIGS. 1 and 2 so that the members 21 extend beyond the uppermost point 37 of the wedge guides 19 by only a small amount and are thus relatively rigidly supported. In this event, the three region contact will tend to relatively center the members 21 and teeth. In addition, initial "fitting" of the stator teeth and members 21 may be further facilitated by a flared portion along the uppermost ends of the members 21 as above discussed. Alignment of the stator and members 21 is further ensured by providing stator guides such as 41 and 43 which mate with corresponding notches 45 and 47 in the stator. It is also possible and preferred to employ a removable stator aligning guide such as that disclosed in the above referenced copending Richard J. Habegger application Ser. No. 311,770 filed on even date herewith, the entire disclosure of which is specifically incorporated herein by reference. Once the stator 17 is in position on the upstanding members 21 with each member fitted to a stator tooth, stator clamp means (as depicted schematically at 49) may be moved into position to prevent the upward movement of the stator 17 during insertion of the winding coils.

Driver 23 is next moved upwardly as viewed in FIG. 1 by the actuation of a not shown air or hydraulic cylinder (or any other suitable device) to move push rod 51 and thus slide the members 21 along the stator bore until they extend, at least slightly, beyond the slots at both ends of the stator. Rod 53 is next actuated by a not shown air or hydraulic cylinder (or any other suitable means) to move the stripper 25 upwardly and thus move the coils 15 along the members 21 and into selected core slots. Push rod 53 is then actuated to move the stripper 25 back to its initial position and push rod 51 actuated to slide the members 21 back to their initial position, whereupon clamp 49 is retracted and the stator 17 (with windings in place) removed. The system is now ready to receive a new set of coils and stator core.

The core injection machine 11 may also be used to move slot closure members such as insulating wedges 55 along adjacent wedge guides and into the stator subsequent to the step of inserting the windings but prior to the step of releasing the clamp arm 49 and removing the stator, all in accordance with techniques now known in the art.

The primary advantage resulting from practicing the invention would be associated with the increased protection against winding insulation damage caused by the core teeth, such protection being afforded by the "wrap around" contour of the blade members 21. Another desirable advantage is that relatively larger wire admitting openings now result.

For example, when members 21 are formed of .008 of an inch material, a core slot opening of .090 of an inch would still be filled through a wire admitting passage (between lips of adjacent members 21) about .074 of an inch wide. On the other hand, previously known apparatus with .010 of an inch thick lips (and .005 of an inch clearance overall vis-a-vis tooth tips) would provide a wire admitting passage of only about .065 of an inch for the same core. Thus, the net increase in size of the wire admitting passage may be as much as 9/65 or between 12 percent and about 14 percent — an appreciable increase in net or "effective" injection opening.

Although the above described refers to members 21 made from sheet steel, other thin material may also be used, e.g., plastic or other suitable material. Blades made from such material may, of course, be molded or extruded. These blades would preferably have one or two yieldable lips as taught hereinabove that would be configured to have a sliding fit with core teeth, like members 21, it being noted that the spacing or slide fit clearance between core teeth and members 21 has been exaggerated in FIG. 4, for purposes of illustration. Thus, regardless of the material used, it is preferred that the blades be contoured and dimensioned to slide freely along stator core teeth and also be sufficiently flexible or resilient to facilitate alignment with such teeth and be yieldable (e.g., when clearances exist) under forces applied thereto during the injection procedure.

Accordingly, while the present invention has been described in detail and summarized with respect to specific exemplifications, modifications will be apparent to persons skilled in the art. It is therefore intended in the appended claims to cover all such changes and modifications that fall within the true spirit and scope of the invention.

What I claim as new and desire to secure by Letters Patent of the United States is:

1. Apparatus for placing coils of winding material into selected slots of a magnetic stator core established by teeth having enlarged extremities, the improvement comprising: a machine base, a plurality of elongated members movable relative to the machine base, said members having a pair of longitudinally extending lips contoured to fit around and cover the enlarged extremities of the core teeth; each of the pair of longitudinally extending lips being interconnected by a longitudinally extending section and spaced from one another to establish a sliding fit along the sides of a core tooth; and means for moving at least some of said members axially along the teeth of the core.

2. The apparatus of claim 1 wherein a plurality of said members are contoured to wrap around the enlarged extremities of the core teeth, and have three spaced apart regions for at least momentarily contacting enlarged core teeth extremities.

3. Apparatus for placing coils of winding material into selected axially extending slots of a magnetizable stator core established by teeth having enlarged extremities, the apparatus including: a frame; a plurality of relatively flexible elongated members movable relative to the frame, said members each comprising at least one longitudinally extending portion contoured to slide axially along the side of a core tooth in close proximity thereto; said at least one portion of two next adjacent ones of the members establishing at least part of a winding turn accommodating gap; winding turn pushing means for moving a plurality of winding turns out of the winding turn accommodating gap and forcing predetermined portions of such plurality of winding turns into a predetermined axially extending core slot; and means for moving said at least two adjacent ones of the members axially along teeth of the core; said at least one portion of said two adjacent ones of the members being formed from resiliently deformable metallic sheet material.

4. The apparatus of claim 3 wherein said at least one portion of said two adjacent ones of the members are contoured to conform to the axially extending extremities of preselected core teeth.

5. The apparatus of claim 3 wherein the deformable metallic sheet material is spring steel.

6. A method of inserting winding turns into selected axially extending slots established by the sides of spaced apart teeth of a magnetizable core with apparatus having a plurality of longitudinally extending relatively flexible members, selected ones of which establish at least part of a plurality of winding turn receiving gaps; the method comprising the steps of: positioning a plurality of winding turns in the turn receiving gaps; relatively moving at least the flexible members and a magnetizable core so that the turn receiving gaps are aligned with axially extending slots of the magnetizable core and so that at least a portion of the flexible members extend into the entrances of the axially extending slots in proximity to the side of respective ones of the teeth defining such slots; and forcing predetermined portions of the winding turns from the turn receiving gaps into slots of the core; the method further including resiliently engaging sides of core teeth with the at least a portion of the flexible members at least while the predetermined portions of the winding turns are being forced into slots of the core.

7. The method of claim 6 wherein resiliently engaging sides of core teeth comprises flexing the at least a portion of the flexible members while forcing predetermined portions of the winding turns into slots of the core so that the at least a portion of all of the flexible members which provide protection for winding turns during the insertion procedure are pressed against a side of a core tooth.

8. The method of claim 6 further comprising the step of relatively sliding the flexible members along the core tooth sides so as to separate the core from the flexible members after the predetermined portions of the winding turns have been forced into slots of the core.

9. Apparatus for placing coils of winding material into selected slots of a magnetic stator core located between spaced apart core teeth, the apparatus including: a frame, a plurality of elongated wedge guides defining winding turn receiving gaps therebetween; a plurality of elongated members movable relative to the frame and wedge guides, said members each comprising at least one longitudinally extending lip contoured to fit against the side of a core tooth and also enclasping an associated wedge guide with a slide fit; and means for moving at least some of said members axially along the teeth of the core; the longitudinally extending lips being formed of relatively thin and relatively flexible material.

10. The apparatus of claim 9 wherein the longitudinally extending lips are formed from thin gauge metallic sheet material; wherein said wedge guides are contoured to correspond to profiles of core tooth extremities; and wherein at least one member includes a pair of longitudinally extending lips, said pair of lips being flared outwardly relative to one another adjacent the free end of said at least one member.

11. Apparatus for placing coils of winding material into selected slots of a magnetic core having openings established by extremities of slot defining core teeth, the improvement comprising: a machine base, a plurality of elongated members movable relative to the machine base, said members having longitudinally extending lips contoured to fit in covering relationship relative to the extremities of the core teeth; each of the longitudinally extending lips being interconnected with a longitudinally extending section and spaced to establish a sliding fit along a side of a core tooth extremity; and means for moving at least some of said members axially along the teeth of the core.

12. Apparatus for placing coils of winding material into selected axially extending slots of a magnetizable stator core established by the extremities of core teeth, the apparatus including: a frame; a plurality of relatively flexible elongated members movable relative to the frame, said members each comprising at least one longitudinally extending portion contoured to slide axially along at least one side of a core tooth in close proximity thereto; said at least one longitudinally extending portion of two next adjacent ones of the members establishing at least part of a winding turn accommodating gap; winding turn pushing means for moving a plurality of winding turns out of the winding turn accommodating gap and forcing predetermined portions of such plurality of winding turns into a predetermined axially extending core slot; and means for moving said at least two adjacent ones of the members axially along teeth of the core; said at least one portion of said two adjacent ones of the members being formed from resiliently deformable material.

13. The apparatus of claim 12 wherein said at least one portion of two adjacent ones of the members are contoured to conform to axially extending extremities of preselected core teeth.

14. The apparatus of claim 12 wherein the members are formed from deformable metallic sheet material.

* * * * *